US008839575B1

(12) United States Patent
Liu et al.

(10) Patent No.: US 8,839,575 B1
(45) Date of Patent: *Sep. 23, 2014

(54) ADJUSTABLE SOLAR PANEL TILE ROOF MOUNTING DEVICE

(71) Applicant: Sunmodo Corporation, Vancouver, WA (US)

(72) Inventors: Jun Liu, Camas, WA (US); Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,024

(22) Filed: Jul. 3, 2014

Related U.S. Application Data

(63) Continuation-in-part of application No. 14/054,790, filed on Oct. 15, 2013, now Pat. No. 8,806,815.

(51) Int. Cl.
*H01L 31/042* (2014.01)

(52) U.S. Cl.
CPC .................................. *H01L 31/0422* (2013.01)
USPC ...................................... 52/173.3; 248/295.11

(58) Field of Classification Search
CPC ....... E04D 5/00; E04D 13/00; E04D 2013/00; F24J 2/52; F24J 2/5203; F24J 2/5207; F24J 2002/522; F24J 2/5247; F24J 2/5249; F24J 2/526; F24J 2/5264; H01L 31/0422
USPC .......................... 52/173.3; 136/244; 126/623; 248/295.11
See application file for complete search history.

(56) References Cited

U.S. PATENT DOCUMENTS

| 5,522,187 | A  | 6/1996 | Bogaerts    |
|-----------|----|--------|-------------|
| 5,669,184 | A  | 9/1997 | Anderson    |
| 6,398,174 | B1 | 6/2002 | Emalfarb    |
| D663,608  | S  | 7/2012 | Ruperto     |
| 2009/0025313 | A1 | 1/2009 | Smidt et al. |

(Continued)

FOREIGN PATENT DOCUMENTS

| CN | 202012534 U | 10/2011 |
|----|-------------|---------|
| CN | 202109682 U | 1/2012  |

(Continued)

OTHER PUBLICATIONS

Tile Roof Hook Universal Mount Installation Manual, Aug. 2012, pp. 2-6, Unirac, Albuquerque, NM.

(Continued)

*Primary Examiner* — Mark Wendell
*Assistant Examiner* — Matthew J Smith
(74) *Attorney, Agent, or Firm* — Stone Creek Services LLC; Alan M Flum

(57) ABSTRACT

Disclosed is a tile roof equipment-mounting device for mounting solar panels and other equipment to tile roofs. The tile roof mount includes a base and an angled bracket. The base can include a base portion channel projecting upward from the base, with stepped grooves, as well as first and second slots running along opposing sides of the base portion channel in a direction parallel to the base. The angled bracket can include complementary stepped grooves that engage the base portion channel. The angled bracket can include a third slot that is perpendicular to the vertex between angled portions of the angled bracket. A threaded fastener can adjustably engage first, second, and third slots. This combination allows the tile roof mount so that the height is vertically discreetly adjustable and horizontally continuously adjustable.

5 Claims, 11 Drawing Sheets

(56) References Cited

U.S. PATENT DOCUMENTS

| | | |
|---|---|---|
| 2009/0044854 A1 | 2/2009 | Placer |
| 2012/0102854 A1 | 5/2012 | Meier et al. |
| 2012/0167364 A1 | 7/2012 | Koch et al. |
| 2012/0193310 A1 | 8/2012 | Fluhrer et al. |
| 2012/0266946 A1 | 10/2012 | West et al. |
| 2013/0048816 A1 | 2/2013 | Wentworth et al. |

FOREIGN PATENT DOCUMENTS

| | | |
|---|---|---|
| DE | 102005059487 A1 | 7/2007 |
| DE | 202007016011 U1 | 5/2008 |
| DE | 202009000960 U1 | 5/2009 |
| DE | 102010039843 A1 | 3/2012 |
| DE | 203020039838 A1 | 3/2012 |
| EP | 1348915 A2 | 10/2003 |
| EP | 1826504 A2 | 8/2007 |
| EP | 2333452 A2 | 6/2011 |
| EP | 2357296 A2 | 8/2011 |
| ES | 1069461 U | 4/2009 |
| FR | 2951508 A1 | 4/2011 |
| GB | 2487568 A | 1/2011 |
| JP | 2012180662 A | 9/2012 |
| KR | 1020120094458 A | 8/2012 |

OTHER PUBLICATIONS

Quick Hook USA—Curved Tile Mount QMCTH, Apr. 2013, Quick Mount PV, Walnut Creek, CA.

Quick Hook USA—Flat Tile Mount QMFTH, Apr. 2013 Quick Mount PV, Walnut Creek, CA.

New Fully Adjustable Tile Hook, Locksolar, accessed on the Internet at www.locksolar.com/products/bracketlegs on Apr. 14, 2013.

Adjustable Mighty Hook, Dec. 2012, ZepSolar Inc., San Rafael, CA.

Adjustable Mighty Hook, SS, Jun. 2013, ZepSolar Inc., San Rafael, CA.

EcoFasten Tile Hook, EcoFastener Solar, Accessed on the Internet at: www.ecofastensolar.com/news.php on Aug. 15, 2013.

K2 Systems Sloped Roof Systems Crosshook-Crossrail System, Jun. 24, 2013, K2 Systems GmbH, Leonberg, Germany.

Aluminum tile hook, Eurosolar, accessed on the Internet at eurosolar.co.uk/products-2/roof-mounting-accessories/aluminium-tile-hook/.

Non-Final Office Action, U.S. Appl. No. 13/223,195, Jul. 2, 2013, United States Patent and Trademark Office, Alexandra, VA.

ADJUSTABLE SOLAR PANEL TILE ROOF MOUNTING DEVICE

CROSS REFERENCE TO RELATED APPLICATIONS

This application is a continuation-in-part of U.S. patent application Ser. No. 14/054,790 filed on Oct. 15, 2013. The entire contents of U.S. patent application Ser. No. 14/054,790 are hereby incorporated by reference.

BACKGROUND

The present disclosure relates to a device for mounting equipment, such as solar panels and other equipment, to tile roofs.

Mounting solar panels, such as solar photovoltaic (PV) panels or solar thermal panels, to tile roofs present its own particular set of challenges. Roof tile can be made of a variety of materials such as ceramic, slate, concrete, or clay. These materials can be brittle and therefore do not present a stable mounting surface for solar panels or other roof mounted equipment as it goes through the normal stress of wind and weather. In addition, roof tiles come in a variety of different shapes and styles, for example, flat roof tile, or curved barrel tile. This variation in shape and style also presents challenges for mounting equipment.

One solution has been to use a mounting device that includes a base portion in combination with a hook or bracket member. A portion of roof tile is removed to expose the roof sheeting. The base engages and secures the mounting device to the exposed roof directly. The hook or bracket member engages the equipment racking system to the mounting device. Flashing is generally placed on top of the base to prevent water infiltration. The removed tile portion is then re-secured over the base with the top tab of bracket member exposed above the tile to allow equipment or mounting hardware to be attached.

One of the challenges with this arrangement is the position of the base is often dictated by the rafters below the roof sheeting and therefore limits the position of roof equipment racking with respect to the roof tile peaks and valleys and the postion of the mounting device.

SUMMARY

The present disclosure describes a device that helps to overcome the challenges of mounting solar panels and other equipment to tile roofs presented in the Background section of this disclosure. In one aspect, the present disclosure describes a mounting device for mounting equipment to a tile roof where the mounting device can be constrained to adjust in discreet steps in two directions and continuously in a third direction after the device is mounted to a tile roof. This allows, for example, an equipment-mounting portion of the mounting device, to be adjusted in three directions relative where the device is attached to the tile roof. This simplifies installation because it allows flexibility in the placement of the equipment racking system relative to mounting device. For example, the mounting device can still be placed so it engages the rafters, as described in the background, but the racking system position is not solely determined by the position of the mounting device as there is some degree of flexibility. The two discrete step adjustments can be along the direction of maximum stress as compared with the continuous step adjustment. This helps assure minimum slippage in the directions of most stress while allowing for a more flexible adjustment along the line of less stress.

In another aspect, the present disclosure describes a mounting device for mounting equipment to a tile roof that includes a base, a bracket, and an equipment mounting extension. The base includes an upward projected channel with stepped grooves on the inside of the channel and a complementary pair of longitudinal slots along the length of each side of the channel. The bracket includes a first bracket portion and second bracket portion projecting away from the vertex edge of the bracket. The first bracket portion includes complementary stepped grooves and a slot transverse to its width that engages the channel and longitudinal slot of the upward projected channel. The transverse slot is aligned with the complementary pair of longitudinal slots and joined by a fastener, such as a complementary nut and bolt. When the fastener is engaged but loose, the bracket can be adjusted continuously along the longitudinal slot and in discrete steps up and down the height of the upward projected channel.

The second bracket portion includes a U-channel projecting away from the end distal to the vertex edge, and parallel to the plane of the second portion top surface. The U-channel includes toothed inner surfaces with the teeth, or steps, running transverse to the length of the second bracket portion or parallel to the vertex edge defining the width of the second bracket portion.

In a further aspect, the toothed inner surfaces of the U-channel are configured to adjustably engage toothed outer surfaces of an equipment mounting extension. In this configuration the equipment-mounting portion acts as an adjustable extension of the second bracket portion. The equipment mounting extension includes an equipment-mounting portion. This can include a slot or an aperture for engaging equipment or can be in the form of an angle bracket, L-bracket, C-bracket, or hook shaped.

This Summary introduced a selection of concepts in simplified form relating to a novel device for mounting equipment to tile roofs. The novel device for mounting equipment to tile roofs is described in further detail in the Description. The Summary is not intended to identify essential features or limit the scope of the claimed subject matter.

DRAWINGS

DESCRIPTION

Figure 1:
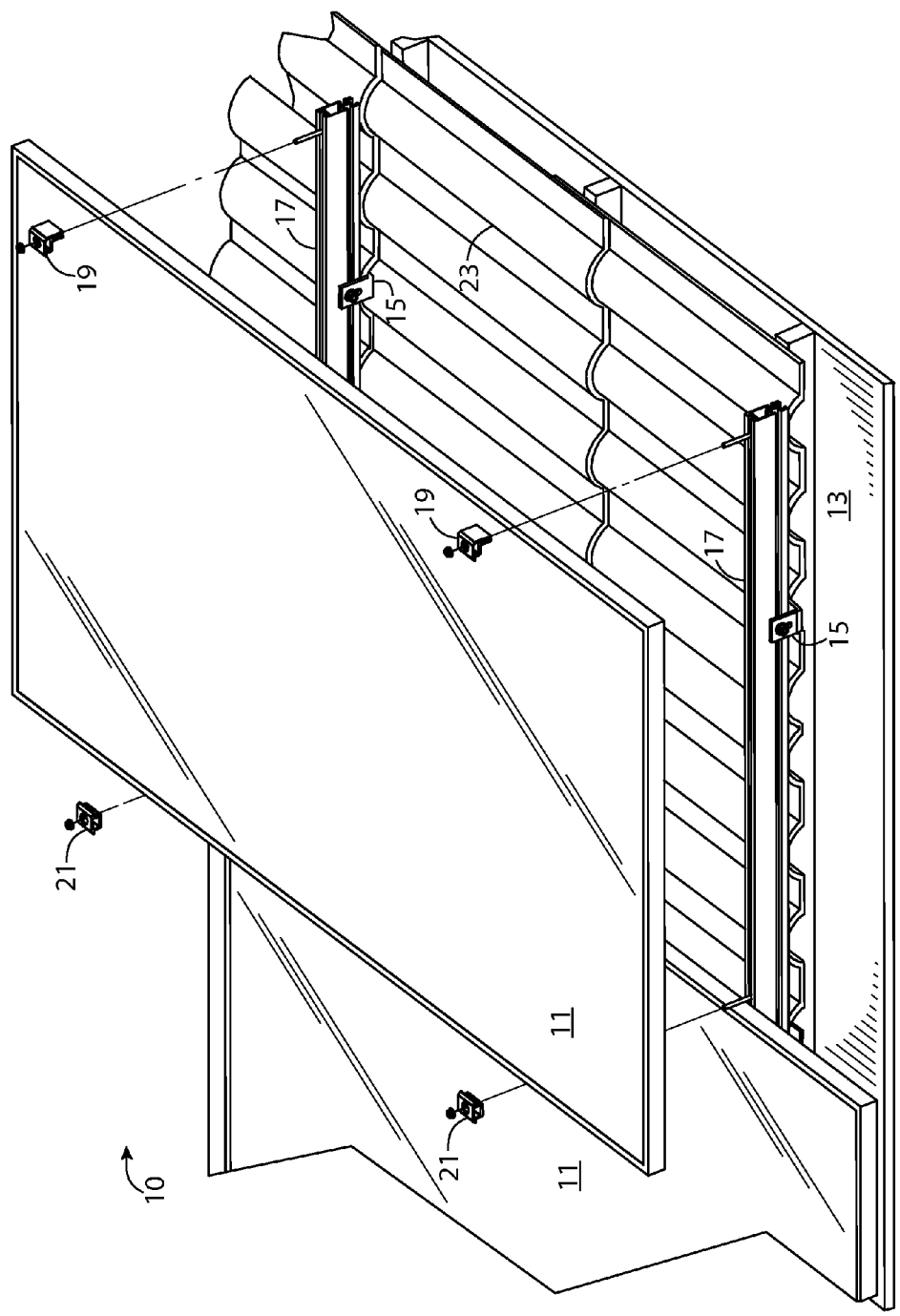
FIG. 1 shows in partially explode perspective view, a solar panel system and tile roof structure with a device for mounting solar panels and other equipment to the tile roof.

The following description is made with reference to figures, where like numerals refer to like elements throughout the several views, FIG. 1 shows in partially explode perspective view, a solar panel system and tile roof structure 10 with a mounting device 15 for mounting one or more solar panels 11 and other equipment to the tile roof 13. Solar panels 11 are secured to rails 17 by solar panel end-clamps 19 and solar panel mid-clamps 21. The rails 17 are secured the mounting device 15. The mounting device 15 is secured to the tile roof 13 under the roofing tiles 23.

Figure 2:
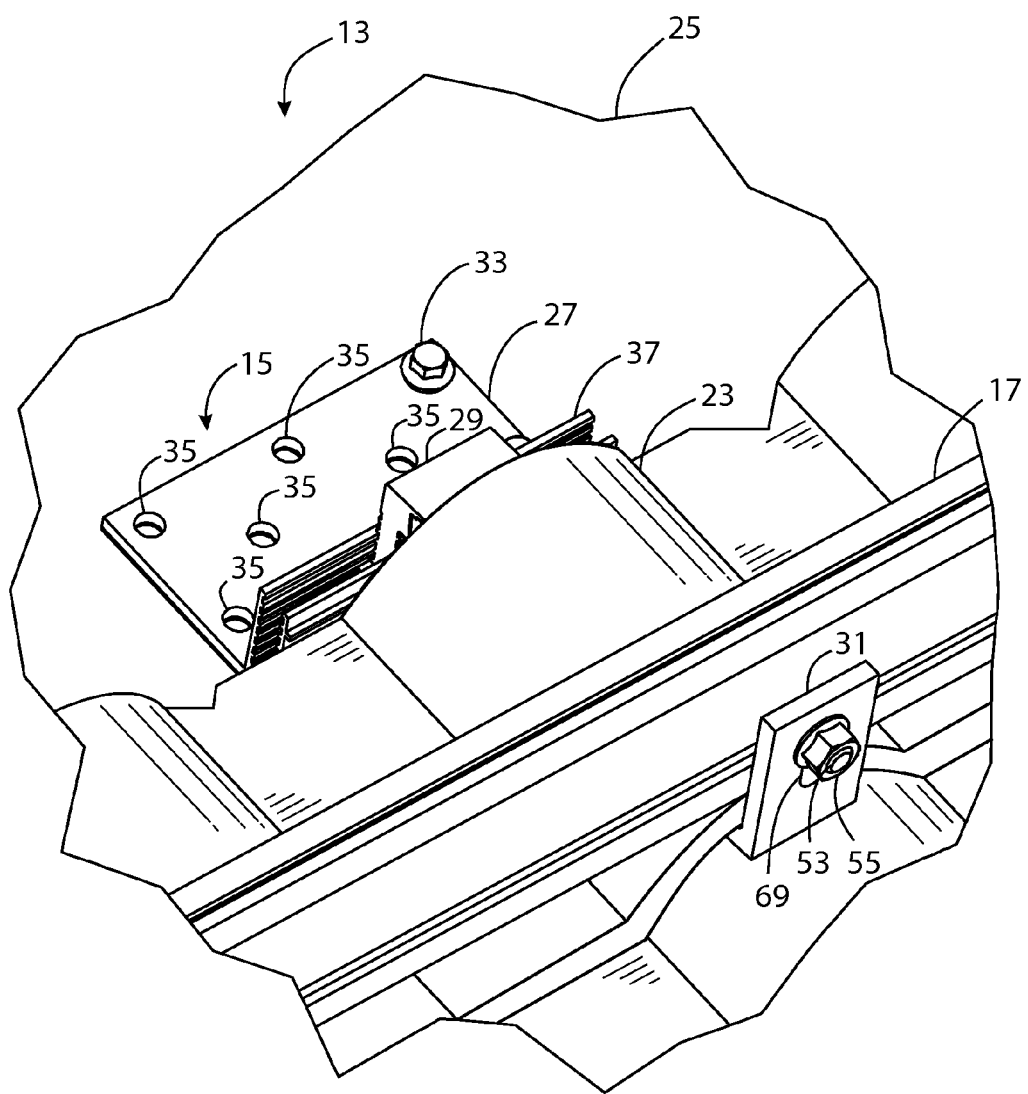
FIG. 2 shows in detail perspective view, the device for mounting solar panels and other equipment to the tile roof of FIG. 1, with an upper tile removed to expose a mounting plate.

To aid in understanding the mounting device 15 in relation to the tile roof 13 and the rails 17, FIG. 2 shows the mounting device 15 mounted on roof sheeting 25 with roofing tiles 23 removed to expose the mounting device 15 structure. The roof sheeting 25 is typically plywood or tarpaper underlayment over plywood, but can be any material suitable for covering a roof. The mounting device 15 includes a base 27, an angled bracket 29, and an equipment-mounting extension 31. The base 27 is shown mounted to the roof sheeting 25 by wood securing fasteners 33, such as a wood screw or lag bolt, through apertures 35 in the base 27. The base 27 includes a base portion channel 37 projecting upward from the plane of the base 27. One end of the angled bracket 29 is secured to the base portion channel 37. The equipment-mounting extension 31 is secured to the other end of the angled bracket 29. The equipment-mounting extension 31 also secures the rail 17 to the mounting device 15 and thereby the roof sheeting 25. To install the mounting device 15, a portion of the roofing tiles 23 are removed, exposing the roof sheeting 25, so that the base 27 can be secured to the roof sheeting 25 directly. Depending on the style of tile roof 13, a portion of the roofing tile 23 may be cut in order to create a space to place both the angled bracket 29 and the equipment-mounting extension 31, as illustrated.

Figure 3:
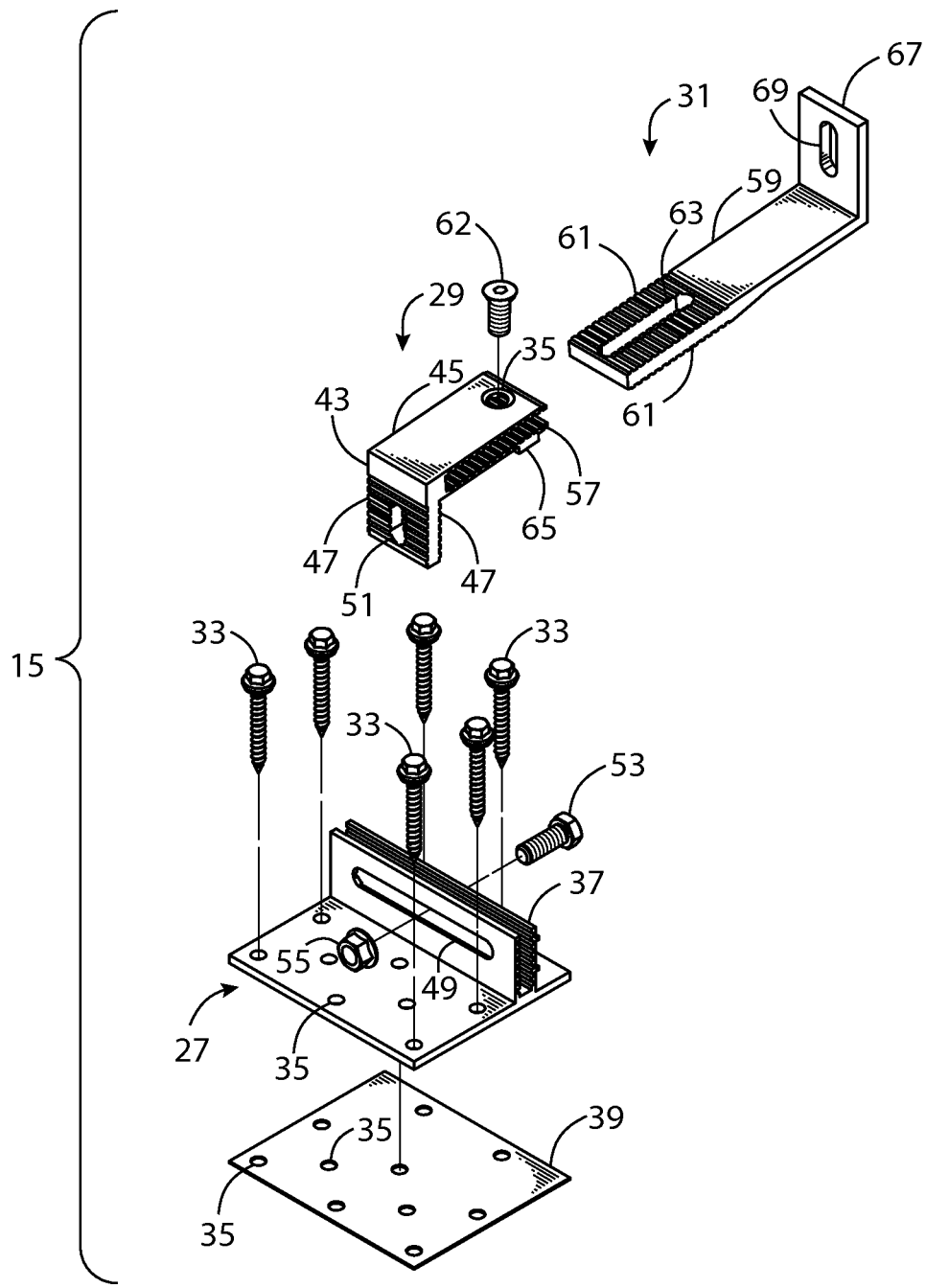
FIG. 3 shows, in exploded perspective view, the device of FIG. 1.

FIG. 3 shows, in exploded perspective view, the mounting device 15. Illustrated are the base 27, the angled bracket 29, and the equipment-mounting extension 31, the wood securing fasteners 33 and a gasket 39. The gasket 39, which is optional, mounts between the base 27 and the roof sheeting. The gasket 39 includes apertures 35 for passing through the body of the wood securing fasteners 33. The apertures 35 are similar in size and location as the apertures 35 of the base 27.

The base 27 is shown with the base portion channel 37 projecting upward from the mounting plane of the base 27. While the base portion channel 37 is shown projecting perpendicularly upward, the base portion channel 37 can project upward at other angles, as required. The base portion channel 37 includes toothed inner surfaces 41. The teeth or steps run longitudinally along the base portion channel 37 and are approximately parallel to the mounting plane of the base 27.

The angled bracket 29 includes a first bracket portion 43 and a second bracket portion 45. The first bracket portion 43 includes toothed outer surfaces 47. The teeth, or steps, run along the width of the angled bracket 29 and parallel to the vertex edge of the angled bracket 29. These toothed outer surfaces 47 of the first bracket portion 43 of the angled bracket 29 are configured to engage with the toothed inner surfaces 41 of the base portion channel 37. The angled bracket 29 can be a right angle L-bracket. Alternatively, the angle between the first bracket portion 43 and the second bracket portion 45 can be, for example, between approximately 80-degrees and 100-degrees as required by the installation.

The base portion channel 37 includes a first and second opposing slots 49 approximately parallel to the bottom edge of and on opposing surfaces of the base portion channel 37. The first bracket portion 43 of the angled bracket 29 includes a third slot 51; the third slot 51 being transverse to width or longitudinal along the length of the angled bracket 29. The toothed outer surfaces 47 of the first bracket portion 43 engages toothed inner surfaces 41 of the base portion channel 37 so that the first and second opposing slots 49 and third slot 51 cross at approximately a right angle. The first and second opposing slots 49 and third slot 51 are secured with a machine-threaded fastener 53 and a nut 55 with complementary threading to the machine-threaded fastener 53. The first and second opposing slots 49 and third slot 51 are positioned so that when the machine-threaded fastener 53 and nut 55 are secured but loose, the angled bracket 29 can be adjusted continuously laterally along the length of the base portion channel 37, captive in the toothed inner surfaces 41 and can be adjusted in discrete steps along the height of the base portion channel 37, each step defined by the toothed inner surfaces 41.

The second bracket portion 45 includes a slotted or hollowed end portion forming a U-channel portion 57. The U-channel portion 57 includes toothed inner surfaces. The equipment-mounting extension 31 includes a first equipment-mounting extension portion 59 with toothed outer surfaces 61 that are configured to engage the toothed inner surfaces of the U-channel portion 57. The teeth, or steps, run transverse to the length of the first equipment-mounting extension portion 59. The U-channel portion 57 includes an aperture 35 sized to pass through a machine-threaded fastener 62 and engage a fourth slot 63 in the equipment-mounting extension 31. The machine-threaded fastener 62 is secured to a threaded portion 65 in the bottom of the U-channel portion 57. The machine-threaded fastener is shown as a countersunk screw with a hex-head but is not limited as such. For example, the machine-threaded fastener 62 can be a non-countersunk bolt. The machine-threaded fastener 62 can alternatively be a slot-head, Philips, or torx-head screw, for example.

The equipment-mounting extension 31 includes a second equipment-mounting extension portion 67 or in the form of an equipment mounting portion. The second equipment-mounting extension portion 67 and the first equipment-mounting extension portion 59 together form an angled bracket. The second equipment-mounting extension portion 67 includes slot 69, or alternatively an aperture, for securing the mounting device. Referring back to FIG. 2, the equipment-mounting extension 31 is secured to the rail 17 by a machine-threaded fastener 53 and a nut 55 through the slot 69.

Figure 4:
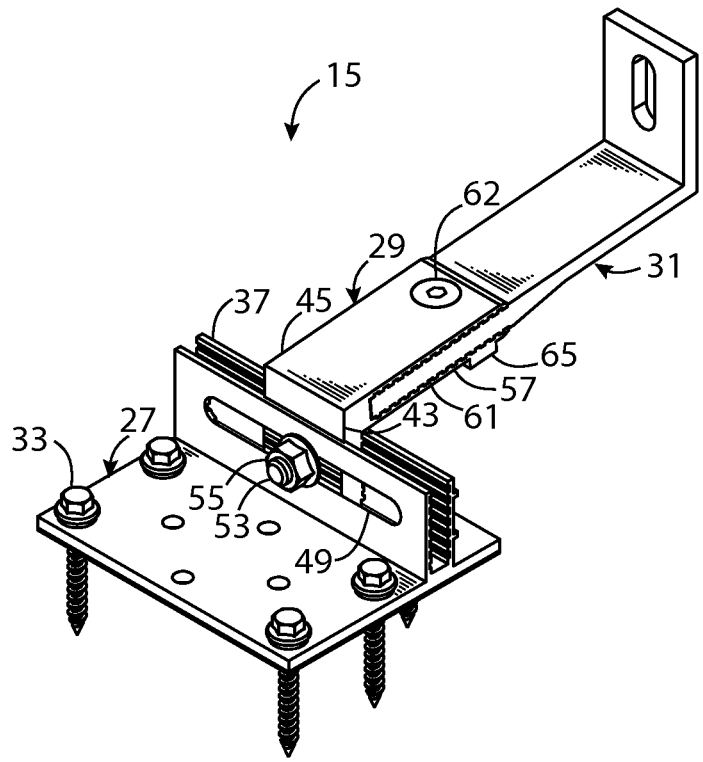
FIG. 4 shows a perspective view of the device of FIG. 1
Figure 5:
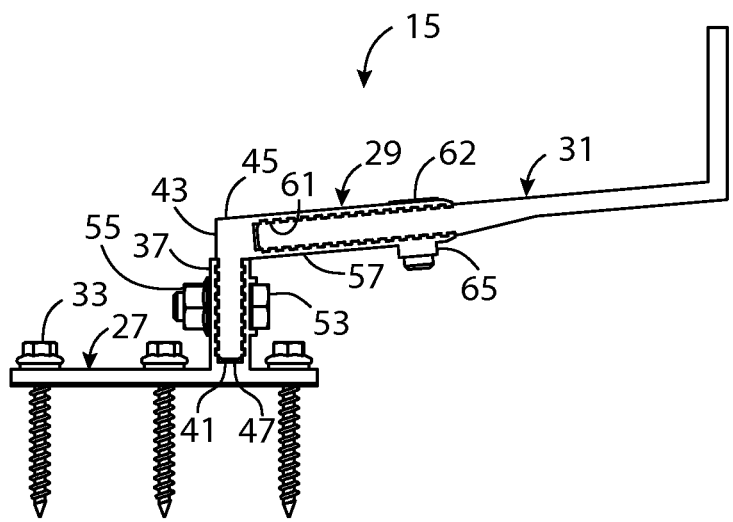
FIG. 5 shows a side view of the device of FIG. 1
Figure 6:
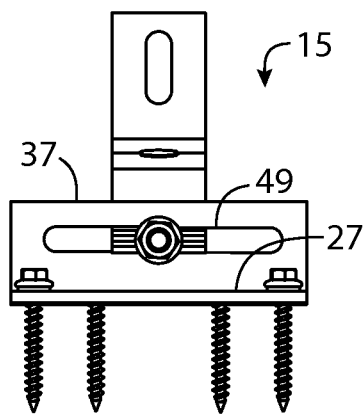
FIG. 6 shows a front view of the device of FIG. 1.
Figure 7:
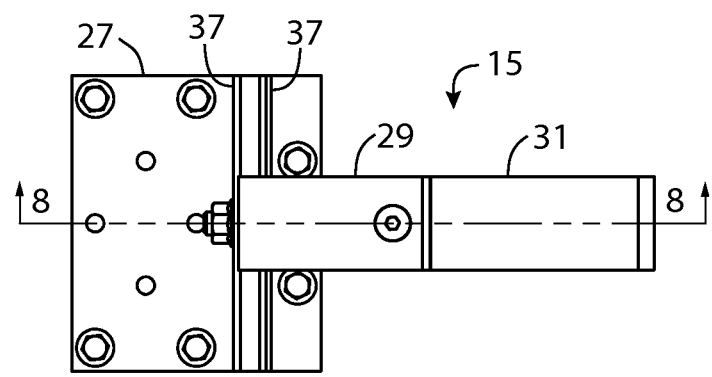
FIG. 7 shows a top view of the device of FIG. 1
Figure 8:
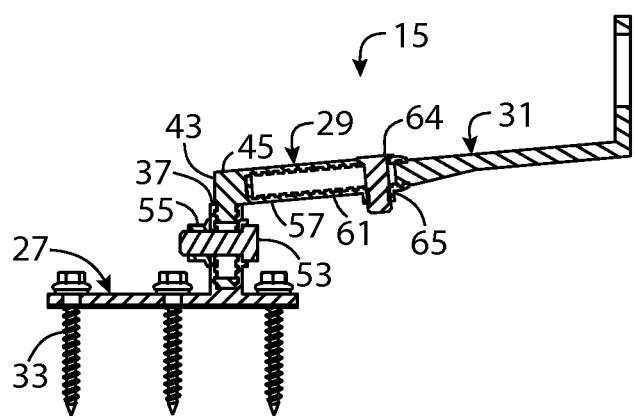
FIG. 8 shows a sectional view of the device of FIG. 1 taken along section lines 8-8 of FIG. 7.

FIG. 4 shows the mounting device 15 in assembled perspective view. FIG. 5 shows the mounting device 15 in side view. FIG. 6 shows the mounting device 15 showing the base portion channel 37 in relation to the base 27 as well as the first and second opposing slots 49 in relation to the base portion channel 37 in front view. FIG. 7 shows a top view of the mounting device 15 showing the base 27 and the base portion channel 37, in relation to the angled bracket 29 and equipment-mounting extension 31. FIG. 8 shows a sectional view of the mounting device 15 taken along section lines 8-8 of FIG. 7. Referring to FIG. 7, the base portion channel 37 is shown offset in relation to the centerline of the base 27. This is done in order to provide a larger fastening surface in order to offset the forces or rotational torque applied to the equipment-mounting extension 31 applied by the solar panels, rails, and other roof mounted equipment. The position of the base portion channel 37 can be adjusted or centered, as desired, in order to accommodate different designs of the equipment-mounting extension 31.

FIGS. 4-5, and 8 show the angled bracket 29 secured to the base 27 with the first bracket portion 43 of the angled bracket 29 engaged with the base portion channel 37 and is secured by the machine-threaded fastener 53 and the nut 55. The wood securing fasteners 33 are shown with their threaded portions passing through the planar portion of the base 27 and with their heads seated against the planar portion of the base 27.

In FIG. 5, the base portion channel 37 is shown with toothed inner surfaces 41, in side view, engaging the toothed outer surfaces 47 of the first bracket portion 43. In FIG. 4, the first and second opposing slots 49 are shown allowing the angled bracket 29 to slide laterally along the toothed inner surfaces 41.

Referring again to FIGS. 4-5 and 8, the second bracket portion 45 of the angled bracket 29, is shown with the U-channel portion 57 with toothed channels transverse to the length of the second bracket portion 45. The U-channel portion 57 is shown engaged with the toothed outer surfaces 61 of equipment-mounting extension 31 and secured with the machine-threaded fastener 53 into the threaded portion 65 of the bottom of the U-channel portion 57.

Figure 9:
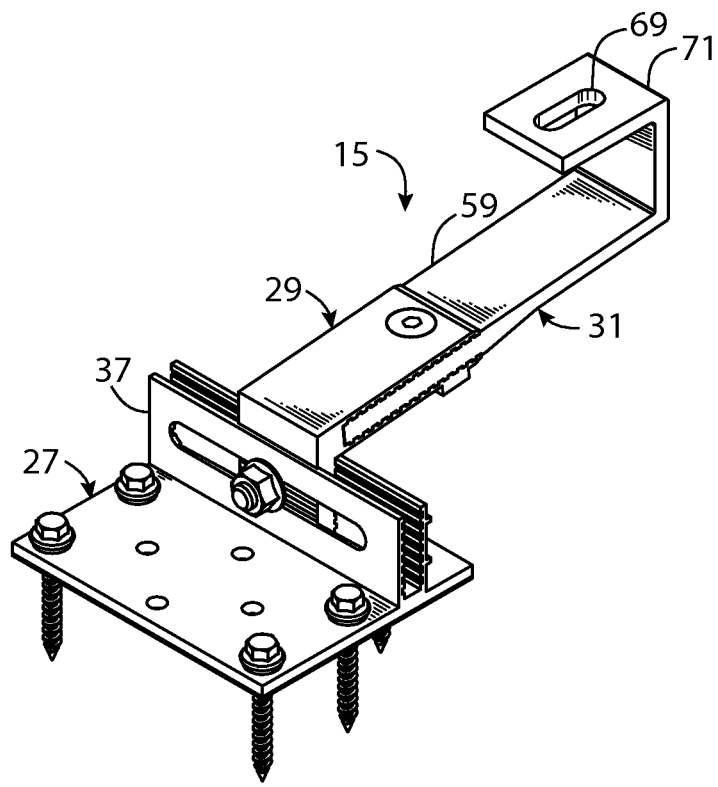
FIG. 9 shows in perspective view the device of FIG. 1 with an alternatively equipment mounting portion.
Figure 10:
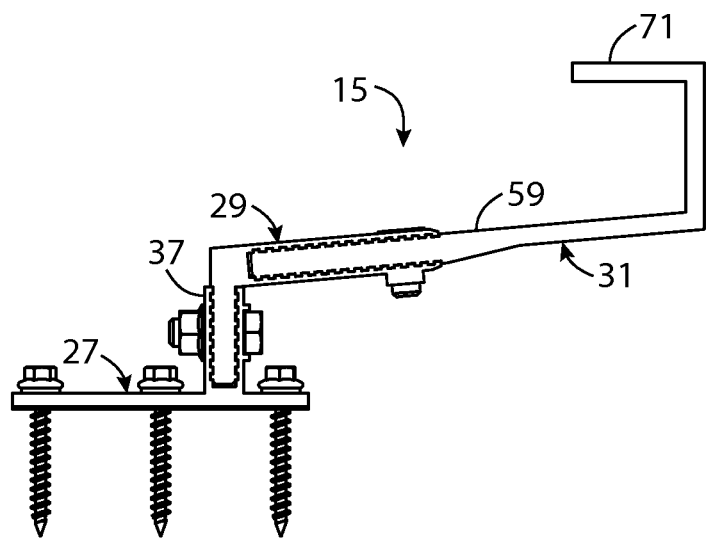
FIG. 10 shows a side view of the device of FIG. 9.

FIG. 9 shows in perspective view the mounting device 15 with an alternatively equipment mounting portion folded over the first equipment-mounting extension portion 59 of the equipment-mounting extension 31. FIG. 10 shows a side view of the mounting device 15 of FIG. 9. In FIGS. 9 and 10, the equipment-mounting extension 31 includes an equipment-mounting end portion 71 the projects upward and then inward creating an inverted L-shape or hook shape with respect to the first equipment-mounting extension portion 59 of the equipment-mounting extension 31. In FIG. 9, the equipment-mounting end portion 71 includes a slot 69 or alternatively, a circular aperture, for mounting equipment. In FIGS. 9 and 10, the equipment-mounting extension 31, angled bracket 29 and base 27 are shown in approximately the same relationship as described for FIGS. 1-8.

Figure 11:
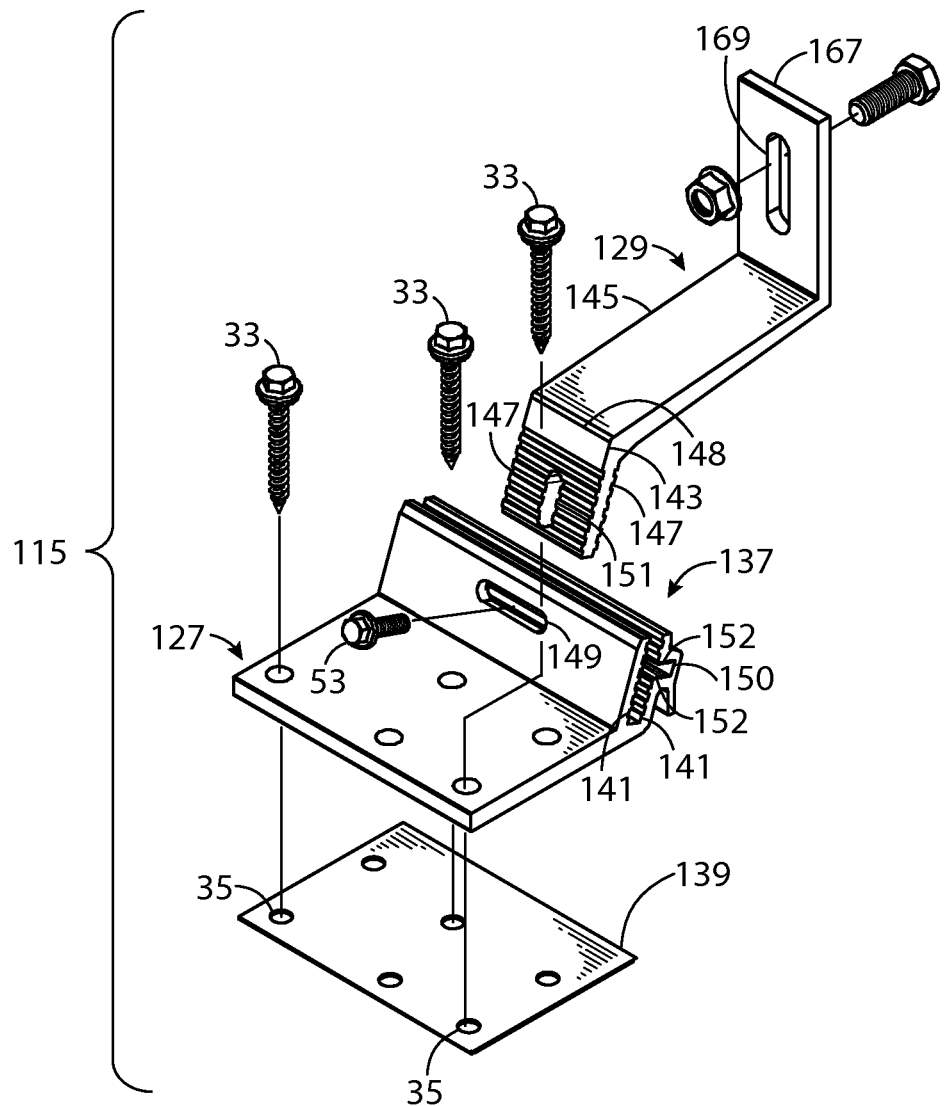
FIG. 11 shows an exploded perspective view of an alternative solar panel system and tile roof structure with a device for mounting solar panels and other equipment to the tile roof.
Figure 12:
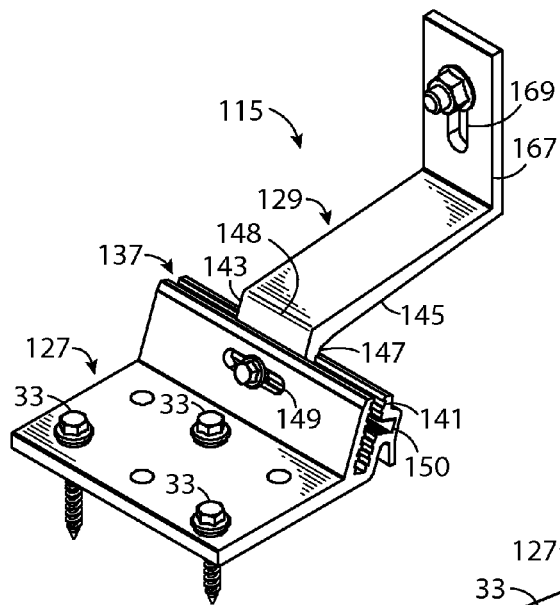
FIG. 12 shows a front and top perspective view of the device of FIG. 11.
Figure 13:
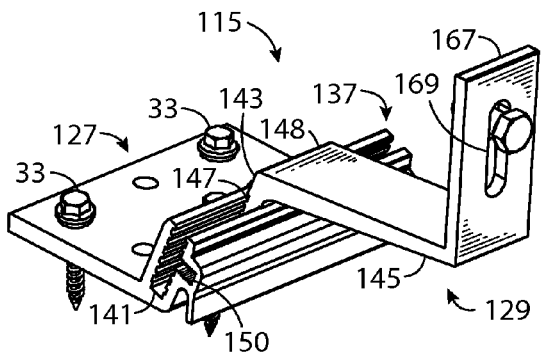
FIG. 13 shows a back and top perspective view of the device of FIG. 11.
Figure 14:
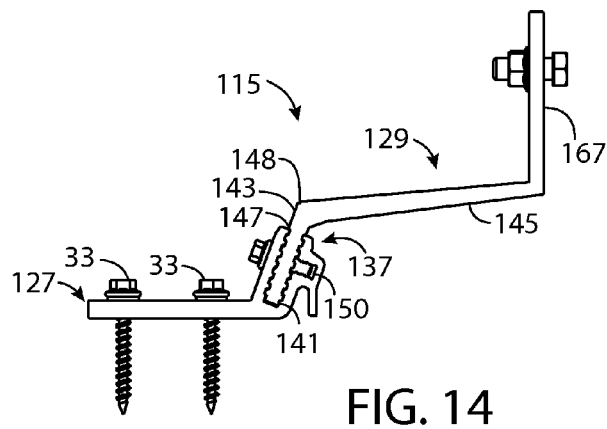
FIG. 14 shows a side view of the device of FIG. 11.
Figure 15:
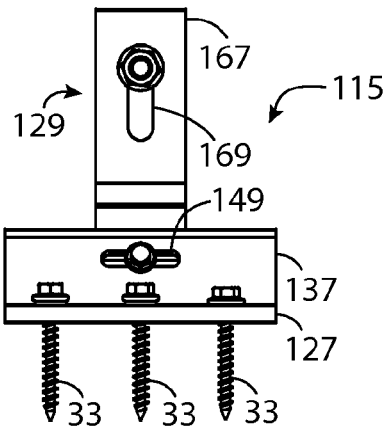
FIG. 15 shows a front elevation view of the device of FIG. 11.
Figure 16:
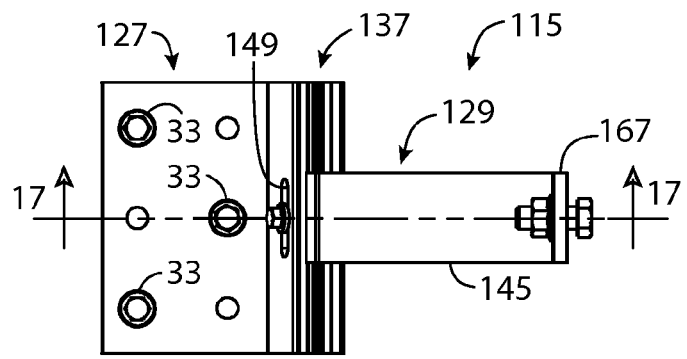
FIG. 16 shows a top plan view of the device of FIG. 11.
Figure 17:
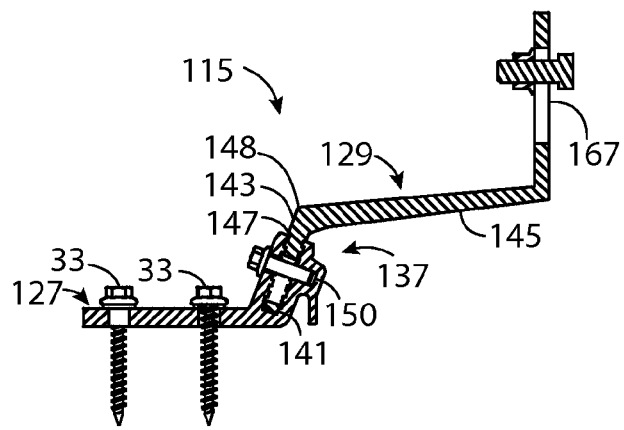
FIG. 17 shows a sectional view of the device of FIG. 16 taken along section lines 17-17.

FIGS. 11-17 show another example of a device 115 for mounting solar panels and other equipment to tile roof in accordance with the present disclosure. FIG. 11 a front exploded perspective view, FIG. 12 shows a front and top perspective view, FIG. 13 shows a back and top perspective view, FIG. 14 shows a side view, FIG. 15 shows a front elevation view, and FIG. 16 shows a top plan view of the device 115. FIG. 17 shows a sectional view of the device 115 of FIG. 16 taken along section lines 17-17. Referring to FIGS. 11-17, illustrated are the base 127, an angled bracket 129, wood securing fasteners 33. FIG. 11 illustrates a gasket 139, which is optional, that mounts between the base 127 and the roof sheeting. The gasket 139 includes apertures 35 for passing through the body of the wood securing fasteners 33. The apertures 35 are similar in size and location as the apertures 35 of the base 127.

Referring again to FIGS. 11-17, the base 127 is shown with the base portion channel 137 projecting upward from the mounting plane of the base 127. The base portion channel 137 is shown projecting upward at an obtuse angle with respect to the central portion of the base 127. Typically, the base portion channel 137 can be angled to project upward from 90 degrees to 135 degrees with respect to the base 127. The base portion channel 137 can project upward at other angles, as required and is not limited to the range given above. The angle is generally limited by the how much torque the wood securing fasteners 33 that secure the base 127 to the roof sheeting can tolerate before the joint between the roof sheet and base fails. The torque is produced by force being applied to the angled bracket 129 by the solar panels and other roof top mounting equipment. While steeper angles allow for more flexible in mounting distance of the equipment with respect to the base 127, the steeper angle will create more stress on the wood securing fasteners 33.

Referring to FIGS. 11-14, and 17, the base portion channel 137 includes toothed inner surfaces 141. The teeth or steps run longitudinally along the base portion channel 137 and are approximately parallel to the mounting plane of the base 127. The angled bracket 129 includes a first bracket portion 143 and a second bracket portion 145. The first bracket portion 143 includes toothed outer surfaces 147. The teeth, or steps, run along the width of the angled bracket 129 and parallel to an outside vertex edge 148 of the angled bracket 129. These toothed outer surfaces 147 of the first bracket portion 143 of the angled bracket 129 are configured to engage with the toothed inner surfaces 141 of the base portion channel 137. The angled bracket 129 is typically angled so that second bracket portion 145, when engaged with the base portion channel 137 is typically 0 to 10 degrees with respect to the horizon or plane of the roof sheeting. In this typical scenario, for a base portion channel 137 with an angle with respect to the plane of the base of 110-degrees, the inside angle between the first bracket portion 143 and the second bracket portion 145 would be 110-degrees+0 to 10 degrees=110 to 120 degrees. For a base portion channel 137 of 100-degrees, for the second bracket portion 145 to make an angle with the horizon of 0 to 10 degrees, the angle between the first bracket portion 143 and the second bracket portion 145 would be between 100 to 110-degrees. The reader should note that these examples are meant to clarify. The claimed invention is not limited only to these angles or to the ranges given. Other angles can be selected depending on factors such as the roof tile length and the height of the roof tile above the roof sheeting as well as the stress factors mentioned in the preceding paragraphs.

The base portion channel 137 includes a first slot 149 shown in FIGS. 11, 12, 15, and 16, and second slot 150 shown in FIGS. 11-14 and 17, the first slot 149 and the second slot 150 on opposing surfaces of the base portion channel 137 and approximately parallel to the bottom edge of the base portion channel 137. As shown in FIG. 11, the first bracket portion 143 of the angled bracket 129 includes a third slot 151; the third slot 151 being transverse to width or longitudinal along the length of the angled bracket 129. The toothed outer surfaces 147 of the first bracket portion 143 engages toothed inner surfaces 141 of the base portion channel 137 so that the first slot 149, the second slot 150, and third slot 151 cross at approximately a right angle. The first slot 149, the second slot 150, and the third slot 151 are secured with a machine-threaded fastener 53 into threading 152 along the inside surface of the second slot 150. Alternatively, the machine-threaded fastener 53 can engage a nut as described for FIG. 3. The first slot 149, the second slot 150, and the third slot 151 are positioned so that the angled bracket 129 can be adjusted continuously laterally along the length of the base portion channel 137, captive in the toothed inner surfaces 141 and can be adjusted in discrete steps along the height of the base portion channel 137, each step defined by the toothed inner surfaces 141.

In FIGS. 11-17, the angled bracket 129 is illustrated including a third bracket portion 167 projecting upward from the second bracket portion 145. The third bracket portion 167 and the second bracket portion 145 together form an angled bracket. In FIGS. 12, 13, and 15, the third bracket portion 167 includes a fourth slot 169, or alternatively an aperture, for securing the mounting device to the rail or other equipment. The fourth slot is shown in FIGS. 11-13, and 15.

Figure 18:
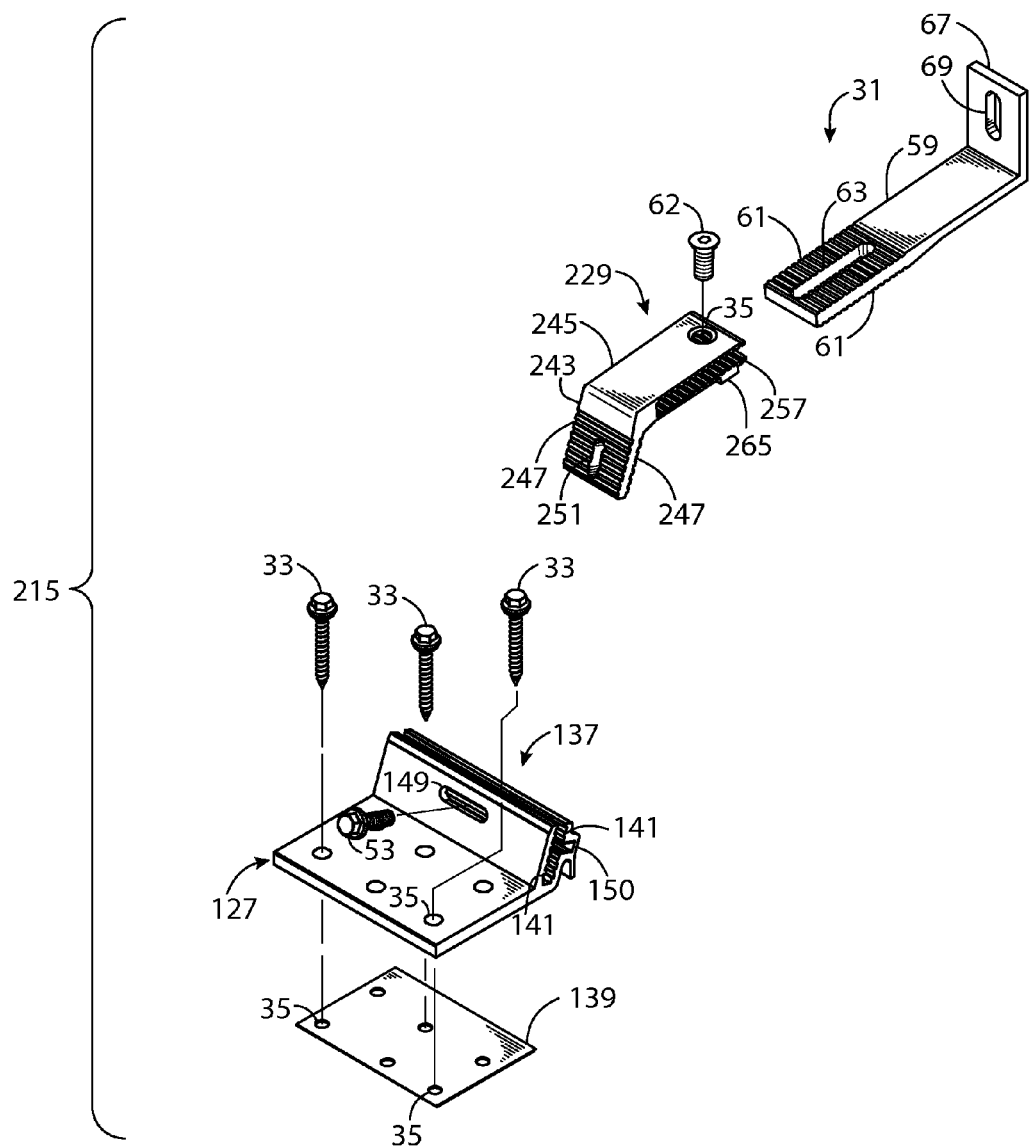
FIG. 18 shows an exploded perspective view of an additional alternative solar panel system and tile roof structure with a device for mounting solar panels and other equipment to the tile roof utilizing the base portion similar to the base portion of FIG. 12 and the equipment mounting bracket similar to the equipment mounting portion of FIG. 3.
Figure 19:
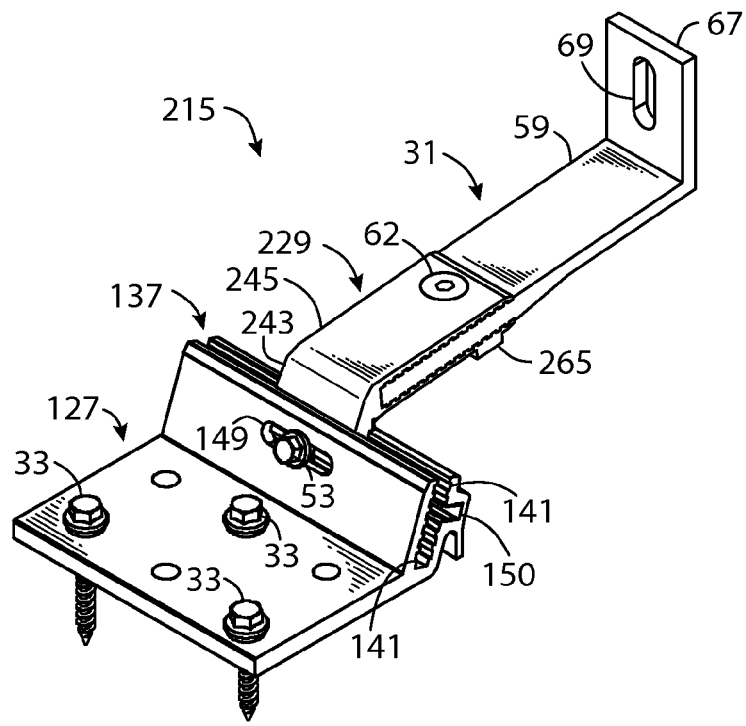
FIG. 19 shows a top and front perspective view of the device of FIG. 18.
Figure 20:
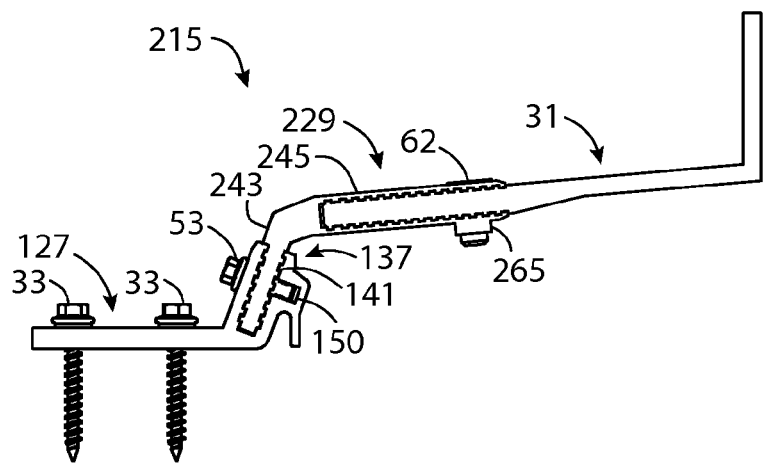
FIG. 20 shows a side view of the device of FIG. 18.

FIG. 18 shows an exploded perspective view of an additional alternative solar panel system and tile roof structure with a device 215 for mounting solar panels and other equipment to the tile roof utilizing the base 127 similar to the base 127 of FIG. 12, and the equipment-mounting extension 31 similar to the equipment-mounting extension 31 of FIG. 3. FIG. 19 shows a top and front perspective view, and FIG. 20 shows a side view of the device 215 of FIG. 18. Referring to FIGS. 18-20, illustrated are the base 127, an angled bracket 229, the equipment-mounting extension 31, wood securing fasteners 33, and machine-threaded fastener 53. FIG. 18 illustrates a gasket 139, which is optional, that mounts between the base 127 and the roof sheeting. The gasket 139 includes apertures 35 for passing through the body of the wood securing fasteners 33. The apertures 35 are similar in size and location as the apertures 35 of the base 127.

Referring again to FIGS. 18-20, the base 127 is shown with the base portion channel 137 projecting upward from the mounting plane of the base 127. The base portion channel 137 is shown projecting upward at an obtuse angle with respect to the center of the base 127, and can project upward at a range of angles, as previously described for FIG. 11.

The base portion channel 137 includes toothed inner surfaces 141. The teeth or steps run longitudinally along the base portion channel 137 and are approximately parallel to the mounting plane of the base 127. The angled bracket 229 includes a first bracket portion 243 and a second bracket portion 245. Referring to FIG. 18, the first bracket portion 143 includes toothed outer surfaces 247. The teeth, or steps, run along the width of the angled bracket 229 and parallel to the outside vertex edge 148 of the angled bracket 229. These toothed outer surfaces 247 of the first bracket portion 243 of the angled bracket 229 are configured to engage with the toothed inner surfaces 141 of the base portion channel 137. The angled bracket 129 is typically angled so that second bracket portion 145, when engaged with the base portion channel 137 is typically 3 to 8 degrees with respect to the horizon or plane of the roof sheeting can be angled with respect to the horizon, or the alternatively, the plane of the roof sheeting, as described for FIGS. 11-17.

The base portion channel 137 includes the first slot 149 shown in FIGS. 18-19, and the second slot 150 shown in FIGS. 18-20, the first slot 149 and the second slot 150 on opposing surfaces of the base portion channel 137 and approximately parallel to the bottom edge of the base portion channel 137. As shown in FIG. 18, the first bracket portion 243 of the angled bracket 229 includes a third slot 251; the third slot 251 being transverse to width or longitudinal along the length of the angled bracket 229. The toothed outer surfaces 247 of the first bracket portion 243 engages toothed inner surfaces 141 of the base portion channel 137 so that the first slot 149, the second slot 150, and third slot 251 cross at approximately a right angle. The first slot 149, the second slot 150, and the third slot 251 are secured with a machine-threaded fastener 53 into threading along the inside surface of the second slot 150. Alternatively, the machine-threaded fastener 53 can engage a nut as described for FIG. 3. The first slot 149, the second slot 150, and the third slot 251 are positioned so that the angled bracket 229 can be adjusted continuously laterally along the length of the base portion channel 137, captive in the toothed inner surfaces 141 and can be adjusted in discrete steps along the height of the base portion channel 137, each step defined by the toothed inner surfaces 141.

Continuing to refer to FIG. 18, the second bracket portion 245 includes a slotted or hollowed end portion forming a U-channel portion 257. The U-channel portion 257 includes toothed inner surfaces. The equipment-mounting extension 31, is as previously described for FIG. 3, and includes a first equipment-mounting extension portion 59 with toothed outer surfaces 61 that are configured to engage the toothed inner surfaces of the U-channel portion 257 of the angled bracket 229. The teeth, or steps, run transverse to the length of the first equipment-mounting extension portion 59. The U-channel portion 257 includes an aperture 35 sized to pass through a machine-threaded fastener 62 and engage a fourth slot 63 in the equipment-mounting extension 31. In FIGS. 18-20, the machine-threaded fastener 62 is secured to a threaded portion 265 in the bottom of the U-channel portion 257.

In FIG. 18-19, illustrated is the second equipment-mounting extension portion 67 of the equipment-mounting extension 31. The second equipment-mounting extension portion 67 and the first equipment-mounting extension portion 59 together form a second angled bracket as previously described for FIG. 3. The second equipment-mounting extension portion 67 includes slot 69, or alternatively an aperture, for securing the mounting device. The equipment-mounting extension 31 can be secured to the rail 17, for example of FIG. 2, by a machine-threaded fastener 53 and a nut 55 through the slot 69.

A device for mounting equipment, such as solar panels, to tile roof structures has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A device for mounting equipment to a roof with roofing tiles, comprising:
    roof securing fasteners;
    a planar base configured to secure to the roof beneath the roofing tiles by the roof securing fasteners, the planar base further includes a base portion channel projecting upward from the planar base, the base portion channel including opposing horizontally toothed inner surfaces, a first slot and a second slot parallel to each other and placed horizontally along and on the opposing horizontally toothed inner surfaces of the base portion channel; and an angle bracket, with a first bracket portion and a second bracket portion extending at an angle from opposing sides of a vertex edge, the first bracket portion including toothed outer surfaces configured to engage the opposing horizontally toothed inner surfaces;

a third slot placed perpendicularly with respect to the toothed outer surfaces along a length of the first bracket portion; and a bolt engaging and securing the first, second, and third slots and constraining the angle bracket to be adjusted horizontally along the opposing horizontally toothed inner surfaces and in discrete steps along a height of the base portion channel.

2. The device of claim 1, wherein, the angle bracket includes an equipment-mounting portion projecting upward from a second bracket portion end and the second bracket portion end is distal from the vertex edge.

3. The device of claim 1, further including:

an equipment-mounting extension bracket;

the second bracket portion includes a U-shaped channel end portion;

the U-shaped channel end portion includes second bracket portion opposing toothed inner surfaces; and the equipment-mounting extension bracket includes extension bracket opposing toothed outer surfaces for adjustably engaging, in discrete steps, the second bracket portion opposing toothed inner surfaces of the U-shaped channel end portion.

4. The device of claim 3, wherein:

the equipment-mounting extension bracket includes an equipment securing upward projected portion.

5. The device of claim 3, wherein:

the equipment-mounting extension bracket further includes a c-shaped portion equipment securing projected portion.

\* \* \* \* \*